United States Patent [19]

Borchardt et al.

[11] Patent Number: 4,497,596

[45] Date of Patent: Feb. 5, 1985

[54] METHOD OF MINIMIZING FINES MIGRATION IN A SUBTERRANEAN FORMATION

[75] Inventors: John K. Borchardt; Bill M. Young, both of Duncan, Okla.

[73] Assignee: Halliburton Company, Duncan, Okla.

[21] Appl. No.: 478,573

[22] Filed: Mar. 24, 1983

[51] Int. Cl.$^3$ ................................................. E02D 3/12
[52] U.S. Cl. .................................... 405/263; 166/293; 166/295; 252/8.55 R
[58] Field of Search .............................. 405/263–267; 166/293, 305, 295; 252/8.55 R; 523/130, 131, 132

[56] References Cited

U.S. PATENT DOCUMENTS

| | | |
|---|---|---|
| 3,057,798 | 10/1962 | Knox . |
| 3,349,032 | 10/1967 | Krieg . |
| 3,419,072 | 12/1968 | Maly et al. .......................... 166/295 |
| 3,434,971 | 3/1969 | Atkins . |
| 3,494,865 | 2/1970 | Andrews et al. . |
| 3,562,226 | 2/1971 | Gayley et al. . |
| 3,704,750 | 12/1972 | Miles et al. . |
| 3,794,117 | 2/1974 | Knox et al. . |
| 3,827,977 | 8/1974 | Miles et al. . |
| 3,832,302 | 8/1974 | Lunsford et al. . |
| 3,868,328 | 2/1975 | Boothe et al. . |
| 3,916,994 | 11/1975 | Maddox et al. . |
| 3,916,995 | 11/1975 | Maddox et al. . |
| 3,916,996 | 11/1975 | Shupe et al. . |
| 3,927,718 | 12/1975 | Tate et al. . |
| 3,943,060 | 3/1976 | Martin et al. . |
| 3,962,332 | 6/1976 | Trapasso . |
| 4,055,502 | 10/1977 | Swanson . |
| 4,062,796 | 12/1977 | Gardner et al. . |
| 4,079,011 | 3/1978 | Tate . |
| 4,152,274 | 5/1979 | Phillips et al. . |
| 4,158,521 | 6/1979 | Anderson et al. . |
| 4,200,151 | 4/1980 | Tate . |
| 4,200,154 | 4/1980 | Tate . |
| 4,206,058 | 6/1980 | Tate . |
| 4,366,071 | 12/1982 | McLaughlin et al. . |
| 4,366,072 | 12/1982 | McLaughlin et al. . |
| 4,366,073 | 12/1982 | McLaughlin et al. . |
| 4,366,074 | 12/1982 | McLaughlin et al. . |
| 4,374,739 | 2/1983 | McLaughlin et al. . |
| 4,393,939 | 7/1983 | Smith et al. .......................... 166/293 |

OTHER PUBLICATIONS

U.S. patent application Ser. No. 367,764—Borchardt, John K. et al., filed Apr. 19, 1982.

*Primary Examiner*—Dennis L. Taylor
*Attorney, Agent, or Firm*—Thomas R. Weaver; Edward F. Sherer

[57] ABSTRACT

A method of stabilizing fines within a permeable subterranean formation comprising contacting the fines with an effective amount of an organic polycationic polymer which contain two quaternary ammonium moieties in the polymer repeating unit.

20 Claims, No Drawings

METHOD OF MINIMIZING FINES MIGRATION IN A SUBTERRANEAN FORMATION

BACKGROUND OF THE INVENTION

1. Field of the Invention

This invention relates to a method of treating a permeable subterranean formation using water soluble organic cationic polymers containing two quaternary ammonium moieties in the polymer repeating units in order to stabilize in the formation migrating fines such as silica, iron minerals and alkaline earth metal carbonates in the presence or absence of clay minerals.

2. Description of the Prior Art

The recovery of fluids such as oil and/or gas has been troublesome in areas wherein the subterranean formation is composed of one or more layers or zones which contain migrating fines such as silica, iron minerals, and alkaline earth metal carbonates. These fines tend to move or migrate to the well bore during the recovery of formation fluids from the particular layers or zones and frequently the migrating fines block the passageways leading to the well bore. Plugging or materially impairing the flow of the formation fluids towards the well bore results in a loss of these fluids to the producer or so decreases the rate of hydrocarbon recovery from the well as to cause the well to be shut down because it is economically unattractive to produce therefrom. An additional adverse factor resulting from the movement of the fines towards the well bore is that they are often carried along with the formation fluids to the well bore and pass through the pipes, pumps, etc. being used to recover the formation fluids to the surface with resulting damage to the moving parts thereof as the fines are very abrasive.

Secondary and tertiary methods of recovering hydrocarbons from a subterranean formation are well known. In general, such a method involves introducing a fluid, such as water, steam, etc., into one or more injection wells which penetrate the formation and forcing the fluid toward a production well. Migrating fine particles during such an operation can cause a decrease of the rate in which the fluid can be injected into the formation and can decrease the permeability or porosity of the formation.

Consequently, in efforts to overcome these problems, various methods have been developed for treating a subterranean formation in order to stabilize portions of the formation. For instance, U.S. Pat. Nos. 4,366,071; 4,366,072; 4,366,073; 4,366,074; and 4,374,739 disclose the use of certain organic polycationic polymers to prevent or reduce the ill effects of swelling clays and/or migrating fines in earth formations.

U.S. Pat. No. 4,199,484 discloses an epoxy resin composition for forming a porous permeable consolidated particulate mass.

U.S. Pat. No. 4,074,536 discloses the use of certain organosilicon compounds to decrease the degradation of natural and artificial consolidated permeable masses which have exposed silica surfaces and which are subject to attack by an aqueous media.

U.S. Pat. No. 3,743,019 discloses a method of controlling loose sands in a formation by introducing into the formation an acid curable resin composition and thereafter introducing into the formation an overflush solution containing an acyl halide hardening agent.

U.S. Pat. No. 3,625,287 discloses the use of organosilicon compounds in sand consolidation resins used in consolidating loose sands.

Other typical methods of consolidating formations are disclosed in U.S. Pat. Nos. 4,070,867 and 4,042,032.

All of the above-cited patents are assigned to the assignee of the present invention and are hereby incorporated by reference.

A major cause of the breakdown of the consolidating structure of both natural and artificially consolidated permeable masses is the contact of an aqueous medium with the exposed surfaces of the migrating fines and/or the dislocation of consolidating material which binds the permeable masses together. Contact of the exposed surfaces with rapidly flowing oil or gas may also cause fines migration. Exposed surfaces of migrating fines result in even the most carefully placed artificial consolidation formulations and procedures for a number of reasons. For example, under certain subterranean conditions, the consolidation may merely deteriorate with time; the consolidation may deteriorate due to thermal expansion and contraction and result in cracks in the consolidating structure; or by merely chemical attack or reaction of portions of the consolidating structure with fluids in the permeable mass.

When consolidation resins are used to control migrating fines, there are certain limitations in the use of these resins. For instance, these resins cannot be used in conjunction with hydraulic fracturing, fracture acidizing and acid stimulation treatments. A well shut-in time frame of 1 to 48 hours depending on the resin and well conditions is required for an effective consolidation treatment.

SUMMARY OF THE INVENTION

The present invention is a method of stabilizing fines within a subterranean formation comprising contacting the fines with an effective amount of an organic polycationic polymer containing two quaternary ammonium moieties in the polymer repeating unit.

The organic polycationic polymers which are suitable for use in accordance with the present invention are those having the general formula:

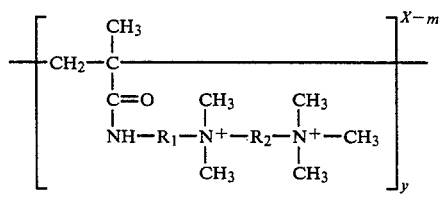

wherein $R_1$ is an alkyl group having from about 2 to 5 carbon atoms;

$R_2$ is an unsubstituted alkyl group having from about 2 to about 6 carbon atoms or a substituted alkyl group having from about 2 to about 6 carbon atoms and containing a hydroxy group or from about 1 to about 3 ether groups; and X is an anion selected from the group consisting of chlorine, bromine, iodine, sulfate, hydroxyl, methyl sulfate and mixtures thereof;

m is an integer equal to the number of anions required to maintain electronic neutrality; and, y is an integer equal to the number of monomer units of said polymer required to increase the viscosity of deionized water to within the range of from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

The organic polycationic polymers used in the method of the invention are particularly effective in treating fines such as silica, iron minerals such as hematite, magnetite, lepidocrocite, wuestite, akaganeite, and siderite, and alkaline earth metal carbonates such as calcite and dolomite. A treatment with the organic polycationic polymers of the present invention is essentially permanent and the polymers are very resistant to being removed by brines, oils, or acids. Formations exhibit high permeability retention after the fines of the formation have been treated with the organic polycationic polymers. Furthermore, the polymers are very effective over a wide range of temperatures and are particularly effective from about 76° F. to about 560° F.

No well shut-in time is required when the organic polycationic polymers are used to carry out the method of the invention.

DETAILED DESCRIPTION OF THE INVENTION

The present invention involves the use of organic polycationic polymers containing two quaternary ammonium moieties in the polymer repeating units to stabilize fines and particularly formations containing silica, various iron minerals such as hematite, magnetite, and siderite and/or alkaline earth metal carbonate fines. These fines may or may not be present with clay minerals. The organic polycationic polymers which are suitable for use in the present invention have the general formula:

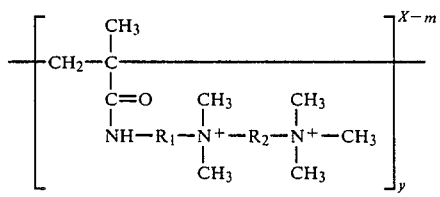

wherein $R_1$ is an alkyl group having from about 2 to about 5 carbon atoms, and preferably propyl;

$R_2$ is an unsubstituted alkyl group having from about 2 to about 6 carbon atoms or a substituted alkyl group having from about 2 to about 6 carbon atoms and containing a hydroxy group or from about 1 to about 3 ether groups, and preferably 2-hydroxypropyl;

X is an anion selected from the group consisting of chlorine, bromine, iodine, sulfate, hydroxyl, methyl sulfate and mixtures thereof, and preferably chlorine.

m is an integer equal to the number of anions required to maintain electronic neutrality; and, y is an integer equal to the number of monomer units of said polymer required to increase the viscosity of deionized water to within the range of from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

The organic polycationic polymers can be used to treat both naturally and artificially consolidated structures. The method of the invention is particularly suited for stabilizing fine particles having a diameter of less than 10 microns.

The preferred organic polycationic polymer of the present invention is poly(methacrylamido-4,4,8,8-tetramethyl-4,8-diaza-6-hydroxynonamethylene dichloride) (PMTDHD) and is represented by the following formula:

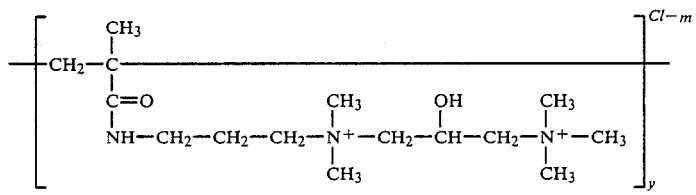

wherein m is an integer equal to the number of anions required to maintain electronic neutrality; and, y is an integer equal to the number of monomer units of said polymer required to increase the viscosity of deionized water to within the range of from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

The organic polycationic polymers of the present invention have sufficient molecular weight to increase the viscosity of deionized water to within the range of from about 250 centipoises to about 10,000 centipoises when 40 grams of the polymer are added to 60 grams of deionized water to form a solution. The viscosity of the resulting solution is measured on a Brookfield Model LVT viscometer, No. 3 spindle, 6 r.p.m. at about 76° F. More preferably, the polycationic polymers of the present invention have a viscosity of about 500 centipoises to about 6,000 centipoises when measured by the above-described method. The most preferred viscosity is about 5,600 centipoises.

One method of preparing the organic cationic polymer of the present invention comprises preparing the monomer by reacting 3-chloro-2-hydroxypropyltrimethylammonium chloride with N',N'-dimethylamino-N-propylmethacrylamide. When this reaction is carried out, PMTDHD monomer is produced.

The synthesis of the monomer can be conducted by dissolving the reactants in water or other suitable solvent and heating the reaction mixture until the synthesis is complete.

These monomers are readily polymerizable. Any known polymerization initiator of the free radical type may be used. Examples of suitable polymerization initiators include t-butyl hydroperoxide, ammonium persulfate, and alkali metal persulfate. The monomers may be polymerized in either a water solution or an emulsion (water-in-oil) process.

The method of the invention can be used with any naturally occurring or artificial consolidation. For example, for permeable masses having exposed surfaces containing fines, the cationic polymer can be placed on the porous mass by merely spraying or pouring the cationic polymer onto the permeable mass. For subterranean formations such as those encountered in oil wells, gas wells, chemical disposal wells, earthen dams, and other subterranean structures, the cationic polymer is preferably placed in a carrier fluid and injected or pumped into the permeable mass.

Normally the contact time required for the organic cationic polymer of the present invention to effectively treat the particle surface of the fines is very short and may be considered to be instantaneous.

The amounts of the organic cationic polymers employed in the method of the present invention will vary according to, for example, the size and porosity of the particular formation and the type of fines present. Therefore there are no upper or lower limits in this regard.

When a carrier fluid is used to carry out the method of the invention, the organic cationic polymers will generally be present in the carrier fluid in a concentration within the range of from about 0.01 to about 5 percent by weight of the carrier fluid. Lower or higher concentrations can be used but are not generally very practical. When a carrier fluid is used, the preferred concentration of the organic cationic polymers is in the range of from about 0.25 to about 0.75 percent by weight of the carrier fluid.

When a carrier fluid is used to carry out the method of the invention, suitable carrier fluids include polar and nonpolar fluids. Examples of suitable fluids are water and low molecular weight alcohols such as methanol, ethanol, and isopropanol. The preferred carrier fluid is water. When water is used as the carrier fluid, the carrier fluid can contain other ingredients which do not substantially interfere with the dispersion or the dissolution of the polymer in the carrier fluid. Furthermore, the water can be gelled or thickened in certain applications. Examples of ingredients which can be included in the water include salts, mineral acids, low molecular weight organic acids, cationic or nonionic surfactants, and wetting agents. Preferably, the carrier fluid has a boiling point in the range of from about 25° to about 200° C. and a viscosity of less than 10 centipoise. Higher viscosity fluids may be used in certain applications but are not generally very practical due to pressure or pumping requirements.

A preferred aqueous carrier fluid is a saline solution containing about 0.1 to about 40 percent by weight of salt. The preferred salt concentration is about 2 to about 12 percent by weight of the solution. The salt can be an alkali metal salt, alkaline earth metal salt, ammonium salt or mixtures thereof. Suitable anions include halides, such as chloride, bromide, iodide, and fluoride, sulfates, carbonates, hydroxides, or mixtures thereof. The halides of potassium, sodium, magnesium, calcium, and ammonium and mixtures thereof are preferred due to the economics and solubility. Aqueous acids having a concentration of about 0.1 to about 40 percent by weight of the solution can also be utilized in carrying out the method of the invention. Examples of suitable acids include hydrochloric acid, hydrofluoric acid, nitric acid, phosphoric acid, sulfuric acid, acetic acid, formic acid, citric acid, and mixtures thereof. The preferred acids include about 3 to about 15 percent by weight hydrochloric acid and a mixture of about 12 to about 15 percent by weight hydrochloric acid, about 1 percent by weight acetic acid and about 0.6 percent by weight citric acid.

The present invention is further exemplified by the examples below and are presented to illustrate certain specific embodiments of this invention, but are not intended to be construed so as to be restrictive of the spirit and scope thereof.

EXAMPLE I

A series of tests were carried out at 145° F. using various organic cationic polymers. The organic polycationic polymers were tested in a simulated formation containing sands and fines. The simulated formation was a sand pack and contained a mixture of 85 percent by weight Oklahoma No. 1 sand (70–170 U.S. Mesh) and 15 percent mineral fines. The mineral fines used to carry out the tests along with their median diameters are shown below:

| Mineral | Diameter (microns) |
|---|---|
| Silica | 22.4 |
| Hematite | 4.4 |
| Calcite | 8.9 |

The tests were carried out at 145° F. by injecting into the sand pack at 5 p.s.i.g. a 236 cc aqueous composition containing 0.46 to 0.47 percent by weight of various organic cationic polymers and 2 percent by weight of ammonium chloride. After completing the injection of the organic cationic polymers through the sand pack, 500 cc of fresh water was injected into the sand pack at 40 p.s.i.g.

The following abbreviations are used for the polycationic polymers used during the tests.

| Abbreviation | Organic Cationic Polymer |
|---|---|
| PMTDHD | Poly(methacrylamido-4,4,8,8-tetramethyl-4,8-diaza-6-hydroxynonamethylene dichloride) |
| DMAECH | Dimethylamine condensate with epichlorohydrin |
| PAPTMC | Poly(acrylamido-3-propyltrimethylammonium chloride) |

The tests using the organic cationic polymers were compared to a control test. The control test was carried out by injecting 236 cc of a composition containing a 2 percent by weight of ammonium chloride into a test cell containing 85 percent by weight of Oklahoma No. 1 sand (70–170 U.S. Mesh) and 15 percent of the mineral fine particles described above. The results of these tests are reported below in Table I and are reported in terms of the percent mineral fines produced using the organic cationic polymers versus the amount of fines produced in the control test.

TABLE I

PERCENT OF FINES PRODUCED WITH CATIONIC POLYMERS VERSUS THE CONTROL TEST (%)

| TYPE OF MINERAL FINE | PMTDHD | DMAECH | PAPTMC | 1:1 WEIGHT RATIO OF PAPTMC - DMAECH |
|---|---|---|---|---|
| Silica | 5.8 | 65.0 | 65.0 | 60.0 |
| Calcite | 28.0 | 165.4 | 49.6 | 151.2 |
| Hematite | 39.5 | 111.6 | 139.5 | 125.6 |

The results of the tests show that PMTDHD was very effective in reducing mineral fines production.

EXAMPLE II

An old open-hole completion well was converted into an injection well and was acidized with a 2000 gallon acidizing composition. The acidizing composition contained 15 percent by weight hydrochloric acid, 1.0 percent by weight acetic acid, 100 pounds of citric acid, 0.1 percent by weight surfactant, 0.1 percent by weight corrosion inhibitor, 0.5 percent by weight anti-sludge agent, 5.0 percent by weight ethylene glycol monobutyl ether, and 0.9 percent by weight of an organic cationic polymer. The organic cationic polymer used in Well #1 was dimethylamine condensate with epichlorohydrin (DMAECH). The ethylene glycol monobutyl ether functioned as a mutual solvent designed to improve the effectiveness of the DMAECH. X-ray diffraction analysis indicated that the formation contained about 65 to about 80 percent quartz, 15 to 20 percent dolomite, less than 2 percent calcite, 5 to 10 percent kaolinite, and about 2 to about 5 percent mixed layer clays. The results of this treatment are reported in Table II as Test 1. The fresh water injection rate 10 and 18 days after the well treatment was considered unsatisfactory.

The same well after the completion of Test 1 was acidized with a 4000 gallon acidizing composition. The acidizing composition contained 15 percent by weight hydrochloric acid, 1 percent by weight acetic acid, 200 pounds of citric acid, 0.1 percent by weight surfactant, 0.1 percent by weight corrosion inhibitor, and 0.7 percent by weight of an organic cationic polymer. The organic cationic polymer used was PMTDHD. No mutual solvent (ethylene glycol monobutyl ether) was used. The results of this treatment are reported in Table II as Test 2.

TABLE II

| Polymers Used | Test | Elapsed Time (days) | Injection Rate (bbl/day) | Injection Pressure (PSI) |
|---|---|---|---|---|
| DMAECH | 1 | 1 | 211.0 | 800 |
| DMAECH | 1 | 10 | 88.7 | 1200 |
| DMAECH | 1 | 18 | 29.2 | 1200 |
| PMTDHD | 2 | 1 | 188.0 | 600 |
| PMTDHD | 2 | 2 | 143.0 | 1060 |
| PMTDHD | 2 | 4 | 184.0 | 1270 |
| PMTDHD | 2 | 9 | 173.0 | 1300 |
| PMTDHD | 2 | 12 | 165.0 | 1310 |
| PMTDHD | 2 | 15 | 128.0 | 1310 |

The well response to the acidizing composition containing PMTDHD was much more favorable than the well response to the composition containing DMAECH.

EXAMPLE III

A series of tests were carried out wherein the use of PMTDHD in a fine treatment was compared to treatments not containing PMTDHD.

The tests were carried out in a simulated formation containing sands and fines. The simulated formation was a sleeve chamber packed from bottom to top with 98 grams of a mixture of Oklahoma No. 1 sand (70-170 U.S. Mesh) and 15 percent by weight of finely divided quartz (median particle diameter of 22.4 microns and less than 325 U.S. Mesh) and then with 7.5 grams of Oklahoma No. 1 sand (70-170 U.S. Mesh).

The tests were carried out by injecting into the simulated formation at 5 p.s.i.g. a 236 cc aqueous composition containing various treatment compositions. After injection of the treatment composition, through the simulated formation, 500 cc of fresh water was injected into the sand pack at 40 p.s.i.g. All percentages are percent by weight of the treating compositions. The results of these tests are shown in Table III.

TABLE III

| Test | pH | Solvent | Percent by weight | Polymer | Percent by weight | Produced Fines (grams) |
|---|---|---|---|---|---|---|
| 1 | 5.5 | NH$_4$Cl | 2 | — | — | 0.19 |
| 2 | 5.5 | NH$_4$Cl | 2 | — | — | 0.25 |
| 3 | 5.5 | NH$_4$Cl | 2 | — | — | 0.21 |
| 4 | 5.5 | NH$_4$Cl | 1 | PMTDHD | 0.45 | 0.01 |
| 5 | 5.5 | NH$_4$Cl | 1 | PMTDHD | 0.45 | 0.01 |
| 6 | 0.5 | HCl | 3 | — | — | 0.09 |
| 7 | 0.5 | HCl | 3 | — | — | 0.11 |
| 8 | 0.5 | HCl | 3 | PMTDHD | 0.45 | 0.05 |
| 9 | 0.5 | HCl | 3 | PMTDHD | 0.45 | 0.05 |
| 10 | — | NaCl | 6 | — | — | 0.14 |
| 11 | — | NaCl | 6 | PMTDHD | 0.45 | 0.05 |

The results of the tests show that PMTDHD was very effective in reducing mineral fines production.

The invention is not limited to the above-described specific embodiments thereof; it must be understood therefore, that the detail involved in the descriptions of the specific embodiments is presented for the purpose of the illustration only, and that reasonable variations and modifications, which will be apparent to those skilled in the art, can be made of this invention without departing from the spirit and scope thereof.

What is claimed is:

1. A method of stabilizing fines within a permeable formation comprising contacting said fines with an effective amount of a polymer having repeating monomer units of the general formula:

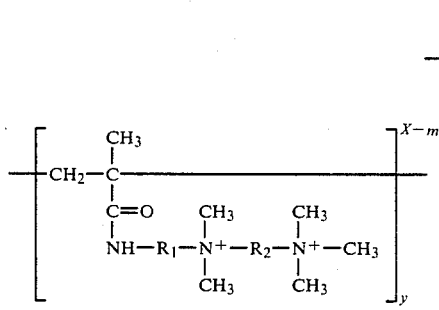

wherein
- $R_1$ is an alkyl group having from about 2 to about 5 carbon atoms, and preferably propyl;
- $R_2$ is an unsubstituted alkyl group having from about 2 to about 6 carbon atoms or a substituted alkyl group having from about 2 to about 6 carbon atoms and containing a hydroxy group or from about 1 to about 3 ether groups, and preferably 2-hydroxypropyl;
- X is an anion selected from the group consisting of chlorine, bromine, iodine, sulfate, hydroxyl, methyl sulfate and mixtures thereof;
- m is an integer equal to the number of anions required to maintain electronic neutrality; and,
- y is an integer equal to the number of monomer units in said polymer required to increase the viscosity of deionized water to from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

2. The method recited in claim 1 wherein said fines are selected from the group consisting of silica, iron minerals, alkaline earth metal carbonates, and mixtures thereof.

3. The method recited in claim 2 wherein $R_1$ is propyl.

4. The method recited in claim 3 wherein $R_2$ is 2-hydroxypropyl.

5. The method recited in claim 1 wherein said polymer is dispersed in a carrier fluid.

6. The method recited in claim 5 wherein said carrier fluid is aqueous and the concentration of said polymer in said carrier fluid is in the range of from about 0.01 to about 5.0% by volume of said carrier fluid.

7. The method recited in claim 6 wherein said aqueous carrier fluid is a saline solution containing up to 40% by weight of salt wherein said salt is selected from the group consisting of an alkali metal, an alkaline earth metal and ammonium halides, sulfates, carbonates, and mixtures thereof.

8. The method recited in claim 1 wherein y is an integer equal to the number of monomer units of said polymer required to increase the viscosity of deionized water to about 5,600 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

9. The method recited in claim 8 wherein said organic cationic polymer is:

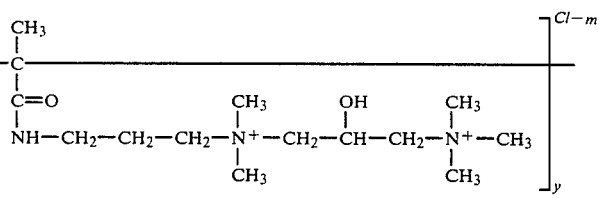

10. The method recited in claim 6 wherein the carrier fluid contains from about 0.1 to about 40% by weight of an acid selected from the group consisting of hydrochloric, hydrofluoric, acetic, formic, citric acid and mixtures thereof.

11. The method recited in claim 1 wherein X is chlorine.

12. A method of stabilizing fines within a consolidated structure comprising contacting said fines with an effective amount of a polymer having repeating monomer units of the general formula:

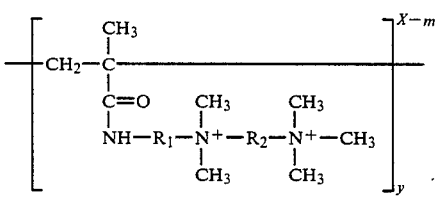

wherein
- $R_1$ is an alkyl group having from about 2 to about 5 carbon atoms, and preferably propyl;
- $R_2$ is an unsubstituted alkyl group having from about 2 to about 6 carbon atoms or a substituted alkyl group having from about 2 to about 6 carbon atoms and containing a hydroxy group or from about 1 to about 3 ether groups, and preferably 2-hydroxypropyl;
- X is an anion selected from the group consisting of chlorine, bromine, iodine, sulfate, hydroxyl, methyl sulfate and mixtures thereof;
- m is an integer equal to the number of anions required to maintain electronic neutrality; and,
- y is an integer equal to the number of monomer units of said polymer required to increase the viscosity of deionized water to from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

13. The method recited in claim 12 wherein said fines are selected from the group consisting of silica, iron minerals, alkaline earth metal carbonates, and mixtures thereof.

14. The method recited in claim 13 wherein said polymer is dispersed in a carrier fluid.

15. The method recited in claim 14 wherein said carrier fluid is aqueous and the concentration of said polymer in said carrier fluid is in the range of from about 0.01 to about 5.0% by volume of said carrier fluid.

16. The method recited in claim 15 wherein said aqueous carrier fluid is a saline solution containing up to 40% by weight of salt wherein said salt is selected from the group consisting of an alkali metal, an alkaline earth metal and ammonium halides, sulfates, carbonates, and mixtures thereof.

17. The method recited in claim 16 wherein y is an integer equal to the number of monomer units of said polymer required to increase the viscosity of deionized water to about 5,600 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

18. The method recited in claim 17 wherein said organic cationic polymer is:

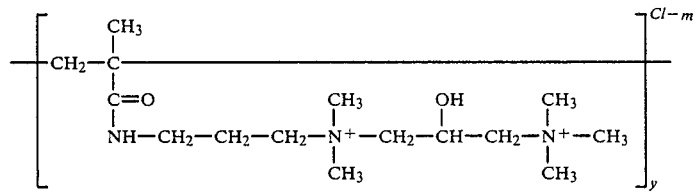

19. The method recited in claim 18 wherein the carrier fluid contains from about 0.1 to about 40% by weight of an acid selected from the group consisting of hydrochloric, hydrofluoric, acetic, formic, citric acid and mixtures thereof.

20. A method of stabilizing loose silica fines having a diameter of less than 10 microns in a permeable mass having a temperature from about 76° F. to about 560° F. comprising contacting said fines with an effective amount of a polymer having repeating monomer units of the general formula:

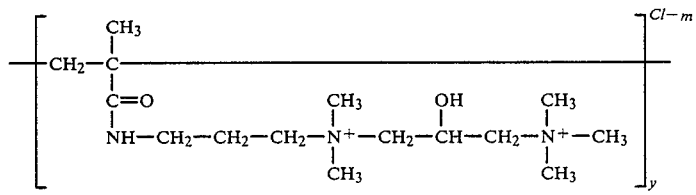

m is an integer equal to the number of anions required to maintain electronic neutrality; and, y is an integer equal to the number of monomer units of said polymer required to increase the viscosity of deionized water to from about 250 centipoises to about 10,000 centipoises said viscosity of said polymer being measured by adding 40 grams of the polymer to 60 grams of deionized water to form a solution and measuring said viscosity of said solution on a Brookfield Model LVT viscometer, No. 3 spindle, 6 r.p.m. at about 76° F.

* * * * *